July 29, 1930.  W. OWEN  1,771,416

PROCESS OF MAKING COMPOSITE GLASS

Filed Nov. 2, 1928

INVENTOR
Wm Owen
by
James E. Bradley
atty

Patented July 29, 1930

1,771,416

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

PROCESS OF MAKING COMPOSITE GLASS

Application filed November 2, 1928. Serial No. 316,701.

The invention relates to a process of making composite glass, and particularly to the procedure whereby the separation of the edges of the sheets making up the composite plates is avoided. Composite glass is formed by cementing to the opposite sides of a sheet of pyroxylin plastic, such as celluloid or pyralin, a pair of glass sheets, the cement employed being ordinarily gelatin. A film of gelatin is dried upon the face of each of the glass sheets, and after the pyralin is placed therebetween, heat and pressure are applied to soften the gelatin and secure proper adhesion, the composite plate thus formed being kept under pressure during the heating operation. The heating and pressing operations are either carried on in rubber containers placed in a pressure tank, or the assembled sheets are placed between the steam heated platens of a hydraulic press. The sheets of glass and pyralin are cut to substantially exact size before compositing, so that the composited plate merely requires that its edges be smoothed up in order to make it a complete finished product ready for use.

Composite plates, as thus produced, develop a tendency to separate or "let go" at the edges. That is the cement will, in a number of cases, let go at certain points along the edges, so that the glass shows a loss of transparency at such points, which in the course of time spreads inward and may require the replacement of the plate. To avoid this trouble, it has been customary to groove out the pyralin along the edges of the plate to the depth of an eighth of an inch or more, and fill the groove with pitch or other sealing material. This expedient is expensive, mars the appearance of the product somewhat, and is not, in all cases, effective in preventing the "let go" or separating.

Figure 1:
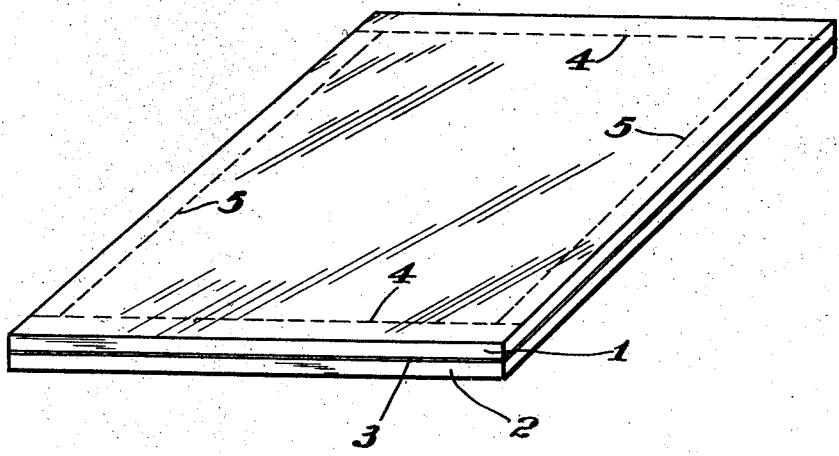

I have found a means of entirely overcoming this separation without employing the sealing operation. Instead of cutting the sheets to approximately finished size, as has heretofore been done, they are cut oversize, ordinarily about one inch greater in length and width than the plate to be produced. The sheets are then composited in the usual way, and the plate thus produced, is trimmed down to exact size by the use of an abrading wheel which acts as a saw. The practice of the invention is illustrated in the accompanying drawings, wherein:

Figure 1 is a perspective view of a sheet of composite glass preliminary to the step of cutting the strips from the edges to bring it to exact size. And Fig. 2 is a sectional view showing the saws or discs cutting through the composite sheet to trim it to size.

Referring to the drawings, the sheets 1, 2 and 3 comprise the composite plate, 1 and 2 being glass sheets cemented to the celluloid or pyralin sheet 3 as heretofore descibed. These sheets are oversize about one inch, so that there is a margin to be cut off each edge about one-half inch in width, the dotted lines 4, 4 and 5, 5 indicating the lines along which the plate must be trimmed to bring it to exact size.

Figure 2:
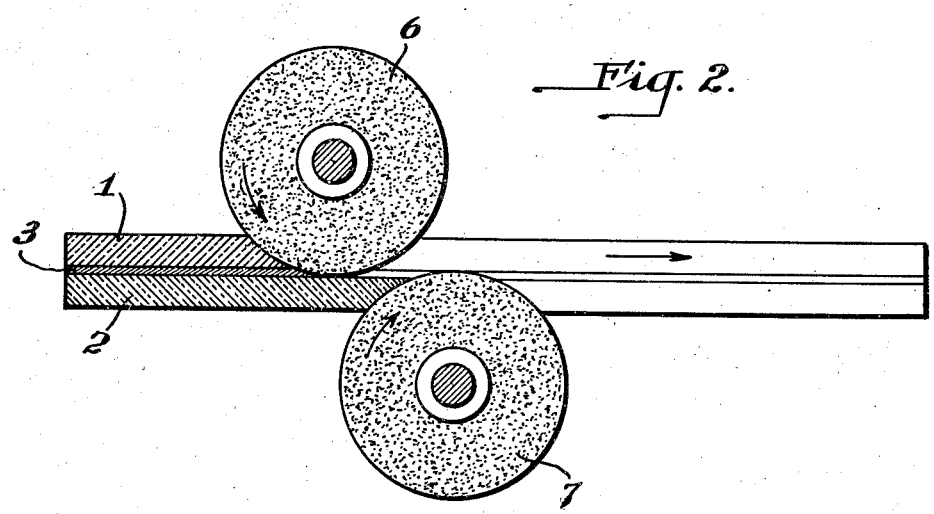

The edges are preferably cut or sawed off by the use of the cutting wheels or discs as indicated in Fig. 2. These discs are preferably made of a bakelite base with carborundum particles embedded therein, such wheels having the necessary strength and wearing qualities. They are relatively thin and are rotated at a high rate of speed. The wheels are set so that their cuts overlap, each wheel cutting through one glass sheet and the pyralin sheet. The plate is carried upon a suitable table (not shown), to which it is secured, and means are provided for feeding the plate between the wheels at a rate upwards of twenty-four inches a minute, depending on the thickness of the plate and the speed of rotation of the wheels.

I have found, as heretofore indicated, that plates composited in this manner do not develop separations or "let goes" at their edges and require no sealing. The cost of sawing off the edges is a small consideration, in view of the improved product secured by the practice of the process, and in view of the avoidance of the requirement for sealing the edges. The surfaces left by the sawing operation are relatively smooth and true so that the labor involved in finishing these edges is relatively slight.

What I claim is:

1. A process of making a composite glass plate of definite predetermined dimensions, which consists in attaching a pair of glass sheets to the opposite sides of a sheet of pyroxylin plastic by the application of heat and pressure, using sheets having over all dimensions greater than said predetermined dimensions, and then cutting strips off all of the edges of the plate thus formed to bring the plate to said predetermined dimensions.

2. A process of making a composite glass plate of definite predetermined dimensions, which consists in attaching a pair of glass sheets to the opposite sides of a sheet of pyroxylin plastic by the application of heat and pressure, using sheets having over all dimensions greater than said predetermined dimensions, and then sawing strips off all of the edges of the plate thus formed to bring the plate to said predetermined dimensions.

In testimony whereof, I have hereunto subscribed my name this 15th day of Oct., 1928.

WILLIAM OWEN.